(12) United States Patent
Mikami et al.

(10) Patent No.: US 7,199,751 B2
(45) Date of Patent: Apr. 3, 2007

(54) RADAR EQUIPMENT

(75) Inventors: Satoshi Mikami, Sapporo (JP); Kaoru Yokoo, Kawasaki (JP); Takayuki Sasaki, Sapporo (JP); Takahiro Suzuki, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 117 days.

(21) Appl. No.: 10/984,544

(22) Filed: Nov. 8, 2004

(65) Prior Publication Data

US 2005/0275583 A1 Dec. 15, 2005

(30) Foreign Application Priority Data

Jun. 14, 2004 (JP) ............................. 2004-175799

(51) Int. Cl.
*G01S 13/58* (2006.01)
*G01S 13/08* (2006.01)
*G01S 13/00* (2006.01)
*G01S 7/40* (2006.01)
*G01S 13/91* (2006.01)

(52) U.S. Cl. ..................... 342/109; 342/89; 342/91; 342/92; 342/104; 342/118; 342/134; 342/145; 342/165; 342/173; 342/175; 342/189; 342/194; 342/195

(58) Field of Classification Search ........ 375/130–153; 342/21, 104–115, 118, 134–145, 175, 189, 342/192–197, 13, 16, 68, 70, 89, 94, 95, 342/98, 102, 103, 128–133, 200, 201, 165–174, 342/91, 92

See application file for complete search history.

(56) References Cited

U.S. PATENT DOCUMENTS 3,641,573 A * 2/1972 Albanese ................... 342/131
3,816,829 A * 6/1974 O'Farrell ................... 342/132
4,005,420 A * 1/1977 McDonald ................. 342/145
4,012,737 A * 3/1977 Waer et al. ................ 342/200
4,045,796 A * 8/1977 Kline, Jr. ................... 342/189
4,115,772 A * 9/1978 Valdes ....................... 342/189
4,216,472 A * 8/1980 Albanese ..................... 342/95
4,396,916 A * 8/1983 Schnerk .................... 342/103
4,443,799 A * 4/1984 Rubin ....................... 342/201
4,513,285 A * 4/1985 Pike et al. ................... 342/98
4,758,839 A * 7/1988 Goebel et al. ............. 342/145

(Continued)

FOREIGN PATENT DOCUMENTS

EP 0601884 A2 * 6/1994

(Continued)

*Primary Examiner*—Bernarr E. Gregory
(74) *Attorney, Agent, or Firm*—Katten Muchin Rosenman LLP (57) ABSTRACT

A radar equipment of the present invention amplifies a reception signal with feedback based on the delay amount obtained from the correlation detection result. Accordingly, it becomes possible to maintain the reception signal (demodulated signal) level to a proper level depending on the distance to the target, and accurate measurement can be achieved with high precision. Namely, the reception signal is amplified depending on the distance to the target, and the reception signal level is made within a tolerable input level range of a logic circuit for performing correlation calculation. In particular, during tracking the target, even when a reflected signal is received with abrupt level variation caused by noise or a reflected signal from an object other than the target, incorrect detection of the target can be avoided by disabling the correlation calculation.

10 Claims, 9 Drawing Sheets

U.S. PATENT DOCUMENTS

| | | | |
|---|---|---|---|
| 5,291,202 A * | 3/1994 | McClintock | 342/132 |
| 5,347,283 A * | 9/1994 | Krizek et al. | 342/201 |
| 5,680,143 A * | 10/1997 | Hershey et al. | 342/118 |
| 5,719,579 A * | 2/1998 | Torre et al. | 342/194 |
| 5,724,041 A * | 3/1998 | Inoue et al. | 342/70 |
| 5,734,389 A * | 3/1998 | Bruce et al. | 342/68 |
| 5,861,834 A * | 1/1999 | Sauer et al. | 342/194 |
| 5,959,571 A * | 9/1999 | Aoyagi et al. | 342/70 |
| 6,211,812 B1 * | 4/2001 | Chiles et al. | 342/145 |
| 6,218,982 B1 * | 4/2001 | Shirai et al. | 342/118 |
| 6,271,786 B1 * | 8/2001 | Huff et al. | 342/16 |
| 6,278,397 B1 * | 8/2001 | Chiles et al. | 342/145 |
| 6,381,261 B1 * | 4/2002 | Nagazumi | 375/138 |
| 6,392,585 B2 * | 5/2002 | Huff et al. | 342/16 |
| 6,864,834 B2 * | 3/2005 | Walton | 342/195 |

FOREIGN PATENT DOCUMENTS

| | | |
|---|---|---|
| JP | 05-040165 | 2/1993 |
| JP | 05-087920 | 4/1993 |
| JP | 05-087921 | 4/1993 |
| JP | 05-256936 | 10/1993 |
| JP | 11-160421 | 6/1999 |
| JP | 2000-009833 | 1/2000 |
| JP | 2000-324015 | 11/2000 |
| JP | 2001-077721 | 3/2001 |

* cited by examiner

RADAR EQUIPMENT

BACKGROUND OF THE INVENTION

1. Field of the Invention

The present invention relates to radar equipment for measuring distance or speed, and more particularly radar equipment exemplarily mounted on a running vehicle, measuring a relative distance or a relative speed between the vehicle and another vehicle running ahead or behind the vehicle, by use of the spread spectrum communication scheme.

2. Description of the Related Arts

When a vehicle (an automobile in particular) is running, in order to avoid collision against a preceding vehicle running ahead of the vehicle of interest, it is necessary to keep a certain distance to the preceding vehicle to run safely. Recently, a vehicle equipped with a distance measurement apparatus to a preceding vehicle has come into practical use. When the measured distance to the preceding vehicle becomes shorter than a predetermined distance, the apparatus issues an alarm to the driver. Furthermore, automatic drive control for keeping a certain distance to the preceding vehicle also becomes available.

A known apparatus for measuring a distance or a relative speed to the preceding vehicle is radar equipment, in which a spread-spectrum communication scheme is applied. The spread spectrum communication transmits a continuous spreading code such as an M-sequence pseudo noise (PN) code. The distance and the relative speed to a target object are measured by performing correlation detection processing on a reception signal reflected at the target. Since the spread spectrum communication has advantages of enabling continuous measurement without producing interference with other apparatuses, the spread spectrum communication has actively been studied and developed.

For example, in the official gazette of the Japanese Unexamined Patent Publication No. 2000-9838, collision-preventive radar equipment for automobile using the spread spectrum communication scheme is disclosed. According to the above disclosure, the equipment is provided with a plurality of correlation detection processing systems so as to capture and track a plurality of targets simultaneously and independently. Further, an analog-to-digital converter (ADC) is provided for digital correlation processing.

However, when handling a high-speed signal of which spreading code speed exceeds, for example, 1 Gbps, a high sampling rate is required for the ADC. This produces a problem of a larger ADC circuit in scale, as well as an increased cost and consumption power.

Also, in the official gazette of the Japanese Unexamined Patent Publication No. Hei-5-256936, on-board radar equipment using the spread-spectrum communication scheme is disclosed. According to this disclosure, the equipment includes multi-stage delay units. A demodulated signal is input into an exclusive-OR circuit. Digital correlation processing is performed in parallel without using an analog-to-digital converter, by use of a plurality of fixed delay amounts which are mutually different.

However, in order to increase accuracy and resolution in the measured distance and relative speed, a delay amount step must be set smaller, which causes an increased circuit scale. Further, a demodulated signal level varies depending on the distance to the target, and when the demodulated signal level becomes out of a tolerable input level range of the exclusive-OR circuit, the correlation processing cannot be performed and the distance cannot be measured.

SUMMARY OF THE INVENTION

Accordingly, it is an object of the present invention to provide radar equipment capable of measuring a distance and a relative speed correctly with high precision using a simple structure.

As a first configuration of the radar equipment in accordance with the present invention to attain the aforementioned object, the radar equipment includes a pseudo noise code generator generating a first pseudo noise code; a delay code generator generating delay codes by delaying the first pseudo noise code by predetermined time unit by time unit; a transmitter transmitting a radio signal modulated by the first pseudo noise code generator; a receiver receiving a reflected signal of a radio signal being reflected on the target, and outputting a second pseudo noise code by demodulating the reflected signal; an amplifier amplifying the second pseudo noise code; a correlation detector detecting the delay amount between the first pseudo noise code and the second pseudo noise code, based on correlation calculation between the delay code and the second pseudo noise code output from the amplifier, and controlling the amplifier gain based on the delay amount; and a calculation section calculating at least one of the distance and the relative speed to the target, based on the delay amount.

As a second configuration of the radar equipment in accordance with the present invention, in the above first configuration of the radar equipment, the correlation detector includes a logic circuit to which the delay code and the second pseudo noise code output from the amplifier are input. The amplifier gain is controlled so that the level of the second pseudo noise code falls within a tolerable input level range of the logic circuit.

As a third configuration of the radar equipment in accordance with the present invention, in the above second configuration, the logic circuit performs the correlation calculation between the second pseudo noise code and each of a plurality of delay codes being delayed by predetermined time unit by time unit over one period of the first pseudo noise code, respectively for a plurality of times. The correlation detector calculates a mean value of the plurality of times of the correlation calculation results for each delay code obtained in the logic circuit, and detects the delay amount based on the mean value for each delay code.

As a fourth configuration of the radar equipment in accordance with the present invention, in one of the above first through third configurations, an adjuster is provided for detecting the existence of phase difference between the first pseudo noise code and the delay code, and adjusting the phase of either the first pseudo noise code or the delay code, so that the first pseudo noise code and the delay code are synchronized when the phase difference is existent.

As a fifth configuration of the radar equipment in accordance with the present invention, in the above fourth configuration, the adjuster adjusts the phase of either the first pseudo noise code or the delay code when initiating the pseudo noise code generator and the delay code generator.

Further scopes and features of the present invention will become more apparent by the following description of the embodiments with the accompanied drawings.

DETAILED DESCRIPTION OF THE PREFERRED EMBODIMENTS

The preferred embodiments of the present invention are described hereinafter referring to the charts and drawings. However, it is noted that the embodiments described below are not intended to limit the scope of the present invention.

Figure 1:
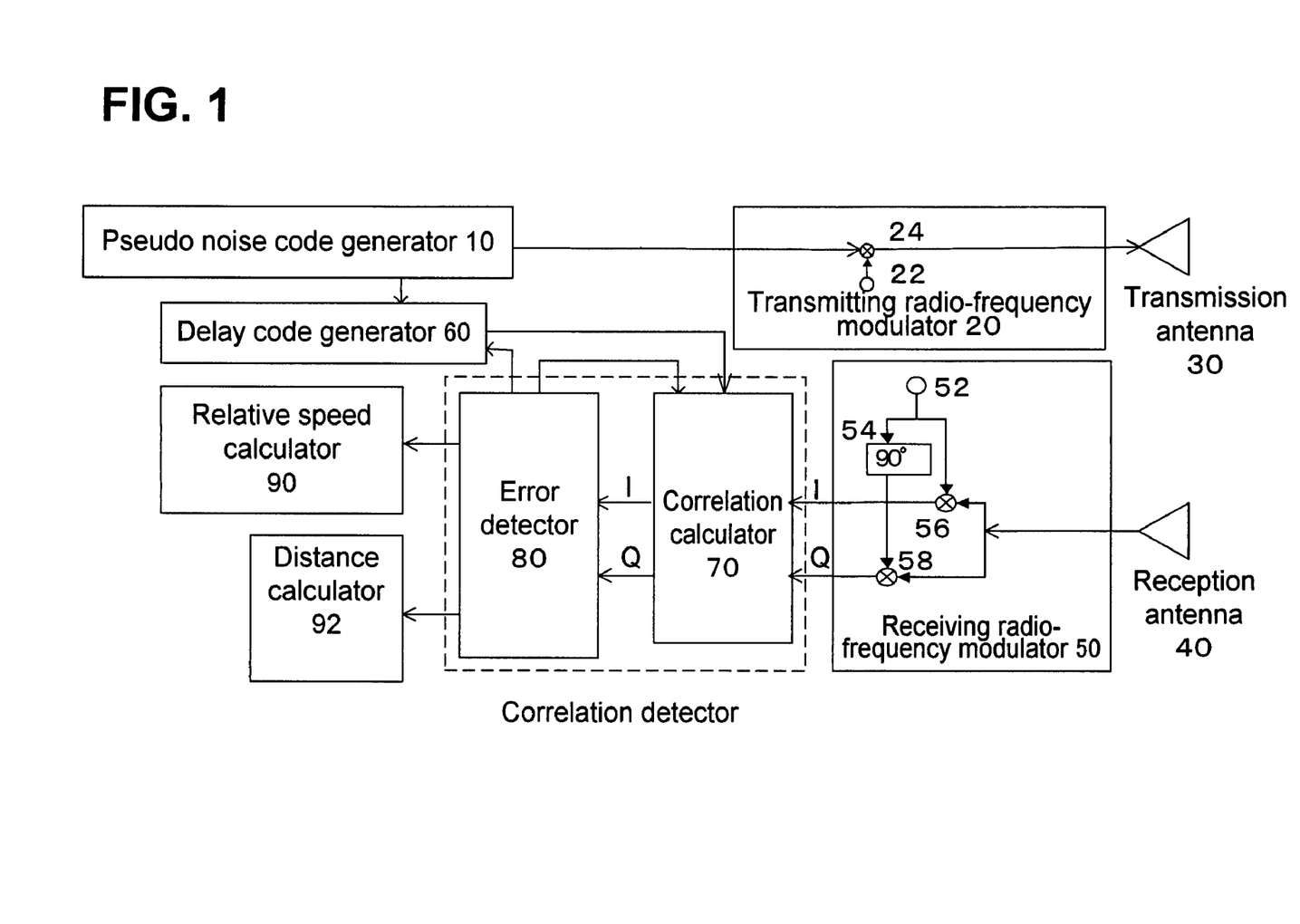
FIG. 1 shows an overall block diagram of the radar equipment in accordance with an embodiment of the present invention.

FIG. 1 shows an overall block diagram of the radar equipment in accordance with an embodiment of the present invention. In FIG. 1, a pseudo noise code generator 10 generates a pseudo noise code (PN code). A transmitting radio-frequency modulator 20 mixes a carrier wave signal supplied from a local oscillator 22 with the PN code supplied from pseudo noise code generator 10 using a mixer 24, and then modulates with the bi-phase PSK (BPSK). With this, an up-converted signal is transmitted as a radio wave from a transmission antenna 30. Here, the modulation scheme is not limited to BPSK, but another modulation scheme may also be applied.

The transmitted radio wave is reflected at the target, and received by a reception antenna 40 with a certain delay and attenuation. Here, reception antenna 40 and transmission antenna 30 may be configured in common as a transmission and reception antenna, or may be configured separately. A receiving radio-frequency modulator 50 performs orthogonal demodulation on the reception signal. More specifically, an output signal from a local oscillator 52 branches into two: The phase of one signal is delayed for 90 degrees by a phase shifter 54, and the two signals are mixed with the reception signal by mixers 56, 58, and down-converted. With this, a demodulated signal consisting of an I-component (I-ch) and a Q-component (Q-ch), of which phases are mutually orthogonal, is obtained. Here, local oscillators 52, 22 may also be configured in common.

A delay code generator 60 is in synchronization with pseudo noise code generator 10, and generates the same PN code as that generated in pseudo noise code generator 10. A delay code produced by delaying the PN code generated in delay code generator 60 is supplied to a correlation calculator 70. According to an instruction from an error detector 80, delay code generator 60 successively outputs delay codes having different delay amounts, while sliding the varied delay amount based on each predetermined unit (for example, 0.5 bit) within one PN code period. Correlation calculator 70 performs correlation calculation for a plurality of times with sliding correlation. The detailed structure of correlation calculator 70 will be described later. Error detector 80 judges existence of correlation by performing predetermined error detection processing against the results of the correlation calculation performed in correlation calculator 70 for a plurality of times. When the existence of correlation is judged, error detector 80 determines a delay amount of the delay code against the PN code. The detailed structure of error detector 80 will also be described later. Correlation calculator 70 and error detector 80 constitutes a correlation detector.

Further, a relative speed calculator 90 and a distance calculator 92 respectively calculate the relative speed and the distance to the target, based on the delay amount of the delay code when the existence of correlation is judged in error detector 80.

Figure 2:
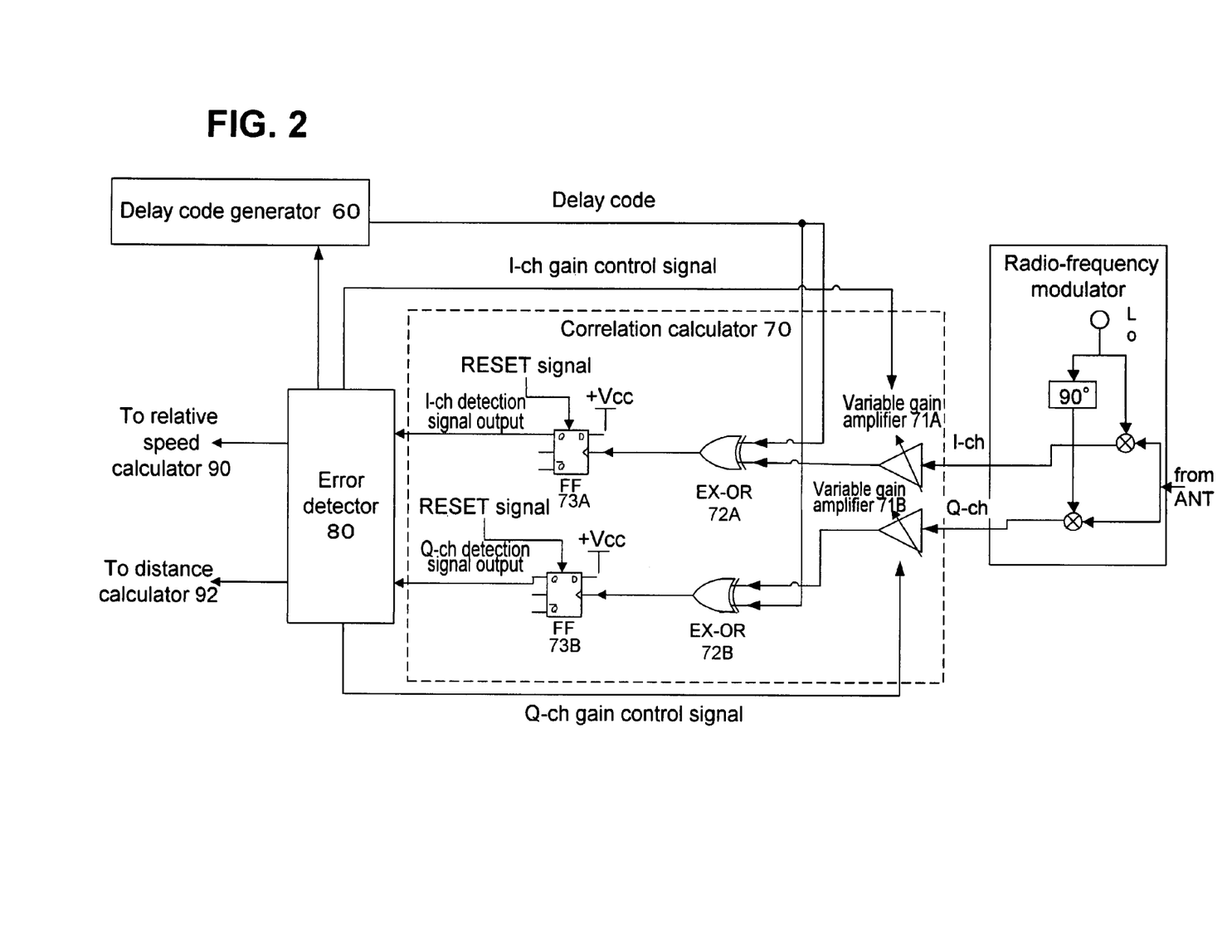
FIG. 2 shows a diagram illustrating an exemplary first circuit configuration of a correlation calculator 70.

FIG. 2 shows a diagram of an exemplary first circuit configuration of correlation calculator 70. The I-component (I-ch) and the Q-component (Q-ch) of the demodulated signal fed from the receiving radio-frequency modulator 50 are respectively amplified by variable gain amplifiers 71A, 71B. The amplified components are then input to exclusive-OR circuits 72A, 72B, respectively. Variable gain amplifiers 71A, 71B amplify the levels of the I-component and the Q-component so that the levels fall within the tolerable input level range of exclusive-OR circuits 72A, 72B. Each gain is feedback-controlled by the delay amount of the delay code obtained when correct correlation detection is judged in error detector 80.

The levels of the I-component and the Q-component fed from the receiving radio-frequency modulator 50 vary, depending on the distance to the target. Namely, the farther the target is located, the smaller the reception signal level is. The levels of the demodulated I-component and Q-component also become smaller. Therefore, even when the target is located within a measurable distance, when the target is positioned excessively near or far, the levels of the I-component and the Q-component become out of the tolerable input level range of exclusive-OR circuits 72A, 72B. In such a case, it becomes necessary to adjust the levels of the I-component and the Q-component so that the levels fall within the tolerable input range of exclusive-OR circuits 72A, 72B. According to the embodiment of the present invention, the gains of variable gain amplifiers 71A, 71B are feedback-controlled by use of the delay amount of the delay code in case existence of the correlation is judged in error detector 80. The reason for this is described below.

First, considering an assumed case that the gains are fixed, the levels of the I-component and the Q-component, which vary with the distance to the target, cannot be kept within the tolerable input range of exclusive-OR circuits 72A, 72B at all times. Further, consider another case that the levels of the I-component and the Q-component are kept constant by use of the automatic gain control (AGC). However, another inconvenience is produced when the level s of the I-component and Q-component are kept constant at all times by means of the automatic gain control. For example, as to the measurement of the distance between two vehicles, the distance therebetween generally varies relatively gradually when the distance is being measured continuously. Accordingly, the levels of the I-component and the Q-component do not vary abruptly. In such a circumstance, if the level of the I-component and the Q-component greatly increase caused by a noise or a reception signal from an obstacle, the levels are controlled constant by the automatic gain control, though the variation is not caused by a change of distance to the preceding vehicle. When the correlation detection processing is performed against such a signal having a temporary great level variation, measurement of distance or relative speed is unexpectedly performed in regard to an object which may not be the target with high possibility. This produces discreteness of continuous measurement of the distance or the relative speed to the preceding vehicle.

Meanwhile, according to the embodiment of the present invention, a gain is determined by the delay amount of the delay code in case error detector 80 judges the correlation is existent. For example, a gain is not varied (decreased) even on the occurrence of a temporary level increase exceeding the tolerable input level of exclusive-OR circuits 72A, 72B. Thus, variation of the level not caused by a varied distance to the preceding vehicle can be omitted from the object of correlation calculation.

Namely, because the gain is not decreased even if the reception signal level is abruptly increased from the level received so far from the target, the input levels to exclusive-OR circuits 72A, 72B exceed the tolerable input level. Also, because the gain is not increased even if the reception signal level is abruptly decreased from the level received from the target, the input levels stay below the tolerable input level. Accordingly, exclusive-OR circuits 72A, 72B do not work under these reception signals. As such, operation of the exclusive-OR circuits 72A, 72B is inhibited against a varied reception signal level which does not seem to be caused by relative variation to the target. This enables reduced probability of incorrect detection, maintaining continuous measurement for the target.

Thus, to one of the input terminals of each exclusive-OR circuit 72A, 72B, the demodulated signal (I-component or Q-component) from variable gain amplifier 71A, 71B is input. Also, to the other input terminals, the delay code from delay code generator 60 is input. The outputs of exclusive-OR circuits 72A, 72B are input to latch circuits (FF) 73A, 73B, respectively.

Figure 3A:
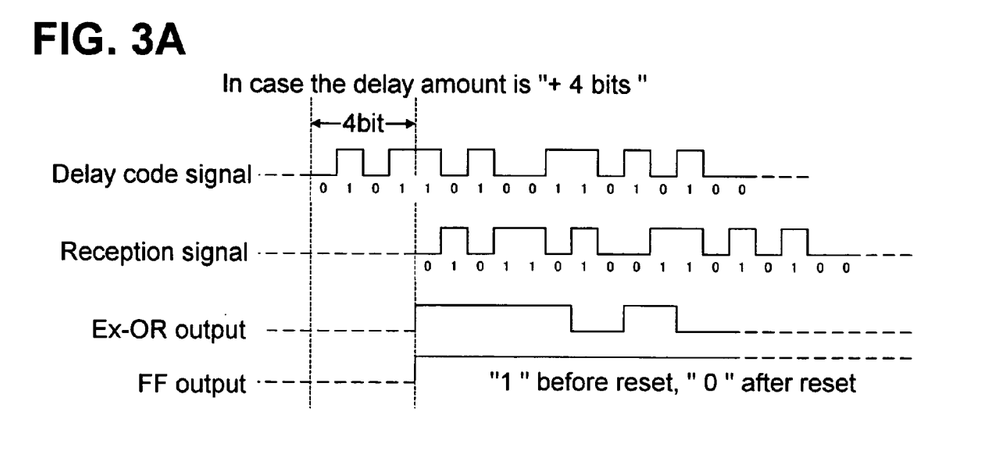
FIG. 3A through 3C show diagrams illustrating correlation calculation by means of exclusive-OR circuits 72A, 72B and latch circuits 73A, 73B.
Figure 3B:
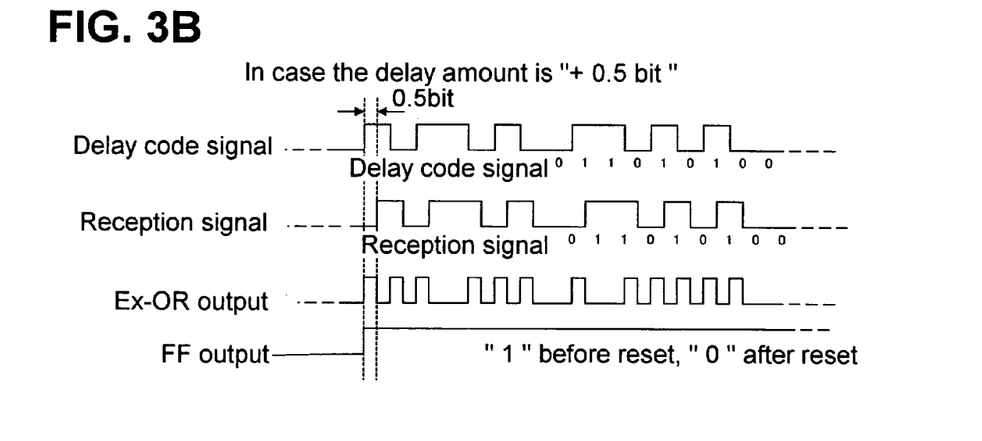
Figure 3C:
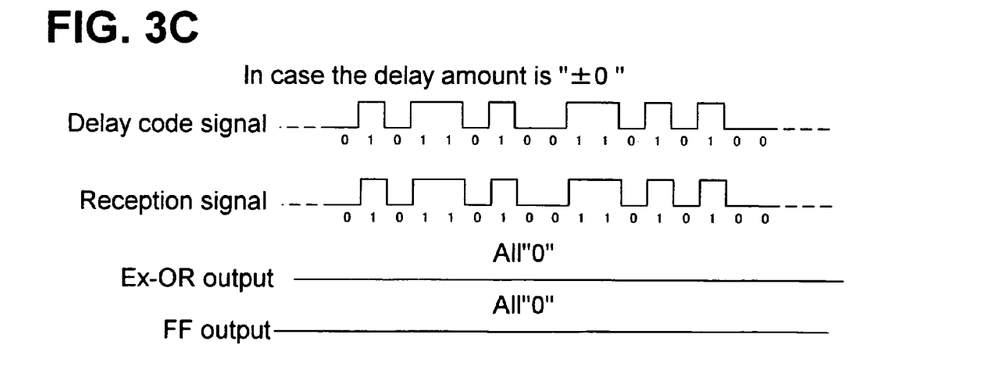

FIG. 3A through 3C show diagrams illustrating the correlation calculation by means of exclusive-OR circuits 72A, 72B and latch circuits (FF) 73A, 73B. As shown in FIG. 3A, for example, when a delay difference between the demodulated signal and the delay code is +4 bits, an H ("1") level is output from each exclusive-OR circuit 72A, 72B at the timing when the values of the demodulated signal and the delay code differ. Latch circuits (FF) 73A, 73B latch the H level until the next reset timing comes. As to the reset interval, an appropriate interval is set considering a response speed of each exclusive-OR circuit 72A, 72B and FF 73A, 73B. Also, as shown in FIG. 3B, for example, when a delay difference between the demodulated signal and the delay code is +0.5 bit, H level ("1") is output from exclusive-OR circuits 72A, 72B at the timing when the values of the demodulated signal and the delay code differ, in a similar way to the above. FF 73A, 73B latch the H level until the next reset timing comes. Namely, the outputs of FF 73A, 73B correspond to the existence of correlation between the demodulated signal and the delay code. When there is no correlation (that is, when the demodulated signal and the delay code are not synchronized) the outputs of FF 73A, 73B become the H level.

Meanwhile, as shown in FIG. 3C, when there is no delay difference between the demodulated signal and the delay code, both values become coincident, and the outputs from exclusive-OR circuits 72A, 72B become the L level ("0"). Therefore, the outputs of latch circuits (FF) 73A, 73B also become the L level. Namely, when the demodulated signal and the delay code are in a correlation condition (i.e. synchronized), the outputs of FF 73A, 73B become the L level. The outputs of FF 73A, 73B are input to error detector 80.

Influenced by noise, etc., correlation detection cannot always be performed by the aforementioned correlation calculation for a delay code, only for one period of the PN code. In addition, incorrect correlation detection may be performed against noise or the reception signal received from an object different from the target to be measured. For this reason, according to the embodiment of the present invention, correlation calculation is performed for a plurality of times. By performing error detection processing against the correlation results performed in error detector 80, correct correlation detection is obtained. Error detector 80 is constituted of, for example, a programmable logic circuit performing the processing procedure described below.

Figure 4:
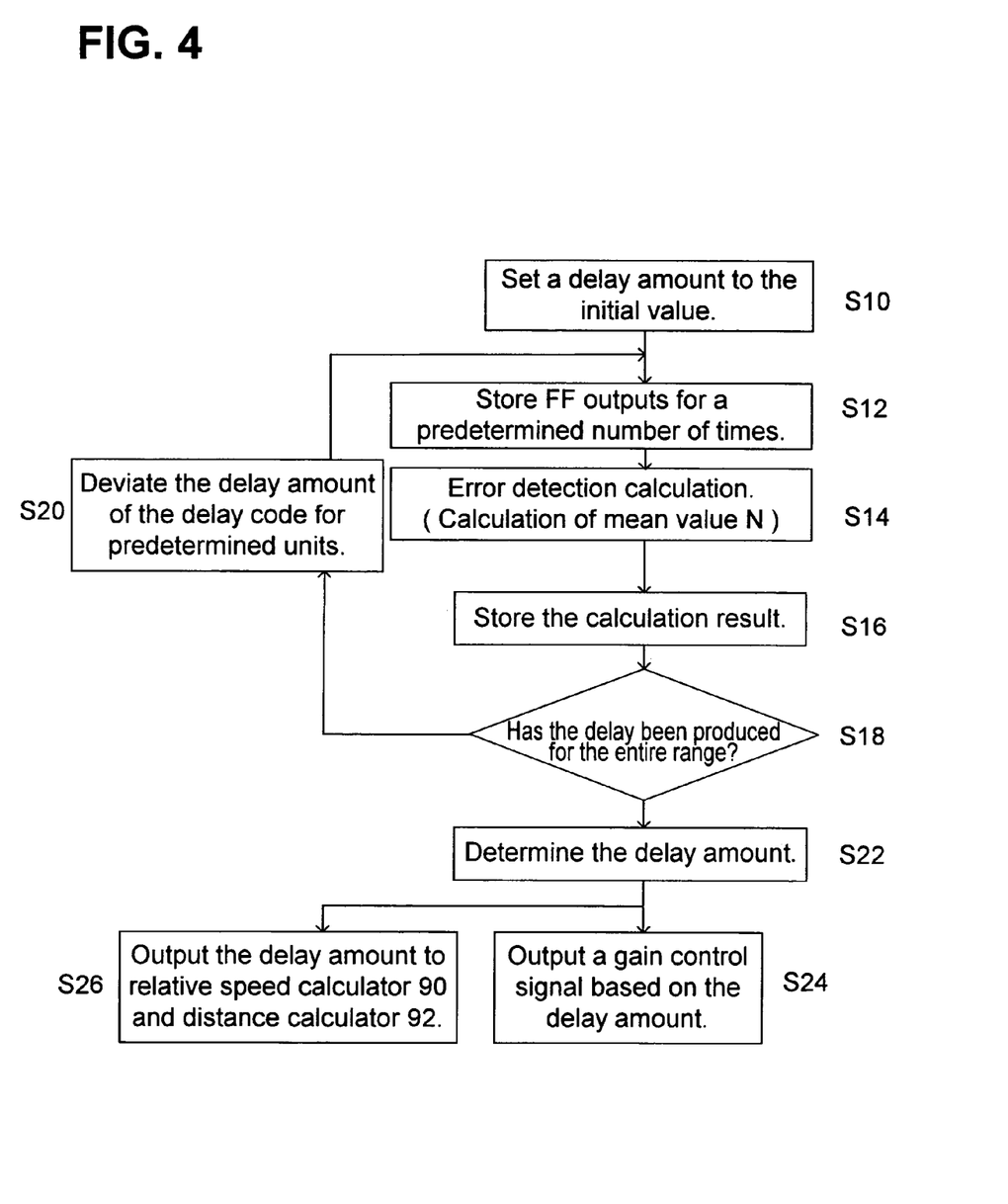
FIG. 4 shows a diagram illustrating processing performed in an error detector 80.

FIG. 4 shows a diagram illustrating processing performed in error detector 80. Error detector 80 sets to code generator 60 an initial value of the delay amount of the delay code to be generated (S10). The initial value of the delay amount may have the same phase as the phase of the PN code generated in pseudo noise code generator 10, or may be deviated for a certain amount. Error detector 80 receives and stores the outputs from latch circuits (FF) 73A, 73B for a predetermined number of reset times (for example, 10 times) (S12). Error detector 80 then performs error detection operation based on the outputs for the predetermined number of times (S14). Typically, error detector 80 calculates a mean value N of the number of times of each L level of FF 73A, 73B (in case the demodulated signal and the delay code are in synchronization). For the number of reset times M, the mean value N is calculated as follows.

$$N = \sqrt{((\text{number of } L \text{ level times in } FF\ 73A/M)^2 + (\text{number of } L \text{ level times in } FF\ 73B/M)^2)}$$

Error detector 80 stores the mean value N calculated above (S16).

Error detector 80 judges whether the delay code has been delayed by predetermined unit by unit over the entire sliding range of the delay amount (i.e. one period of the PN code) (S18). When the above error detection operation is not completed for the entire delay amounts delayed by predetermined unit by unit over the sliding range, error detector 80 delays the delay amount of the delay code from delay code generator 60 by a predetermined unit (for example, 0.5 bit) more, and repeats the processing of the above steps S12 through S14. Namely, error detector 80 stores the outputs of FF 73A, 73B for the number of reset times, and calculates the mean value N. In step S18, on completion of the above error detection operation for the entire delay amounts delayed by predetermined unit by unit over the sliding range, error detector 80 compares the maximum mean value $N_{max}$, which is the maximum among the mean values N corresponding to each delay amount delayed by predetermined unit by unit, with a predetermined threshold. If the mean value $N_{max}$ exceeds the threshold, error detector 80 judges that correlation is existent, and determines the delay amount producing the mean value $N_{max}$ as delay amount corresponding to the distance or the relative speed to the target (S22). Additionally, if any mean values do not exceed the threshold, the process returns to S12, and correlation detection is started afresh.

Based on the determined delay amount, error detector 80 adjusts the gains of variable gain amplifiers 71A, 71B (S24). For example, error detector 80 has a table indicative of the delay amount and the gain, and determines the gain based on the table value. Error detector 80 supplies control signals (an I-ch gain control signal and a Q-ch gain control signal shown in FIGS. 3A–3C), which are based on the determined gain, to variable gain amplifiers 71A, 71B.

Further, error detector 80 outputs the determined delay amount to relative speed calculator 90 and distance calculator 92 (S26). Based on the received delay amount, relative speed calculator 90 and distance calculator 92 calculate the relative speed and the distance to the target, respectively.

As such, in the embodiment of the present invention according to the aforementioned exemplary first circuit configuration, correlation calculator 70 and error detector 80 for correlation detection processing can be configured of a simple digital processing circuit without using an analog-to-digital converter. Thus, it becomes easy to incorporate the circuit into an LSI, and reduction of power consumption, miniaturization and cost reduction can be attained. Further, by amplifying the demodulated signal level based on the phase difference (delay amount) at the time correlation is judged existent, incorrect detection of an object other than the target can be eliminated, and accurate tracking of the target can be achieved.

Now, delay code generator 60 generates a pseudo noise code identical to the pseudo noise code generated in pseudo noise code generator 10, and outputs a delay code in which the pseudo noise code is delayed for a predetermined amount. In order to delay the delay code fed from delay code generator 60 for an accurate delay amount from the pseudo noise code fed from pseudo noise code generator 10, it is necessary that the pseudo noise code generated in delay code generator 60 be synchronized with the pseudo noise code generated in pseudo noise code generator 10. However, for example, at the time of initiating delay code generator 60 and pseudo noise code generator 10, there is a case that both pseudo noise codes are not synchronized before the delay generation stage of the pseudo noise code. In such a case, phase adjustment is required for synchronizing both codes. In the following, a synchronization adjustment method between pseudo noise code generator 10 and delay code generator 60 will be described, focusing on a method for adjusting the delay code phases based on the phase of the pseudo noise code. Here, using the same adjustment method as the above, it may also be possible to adjust the phase of the pseudo noise code based on the delay code phase.

Figure 5A:
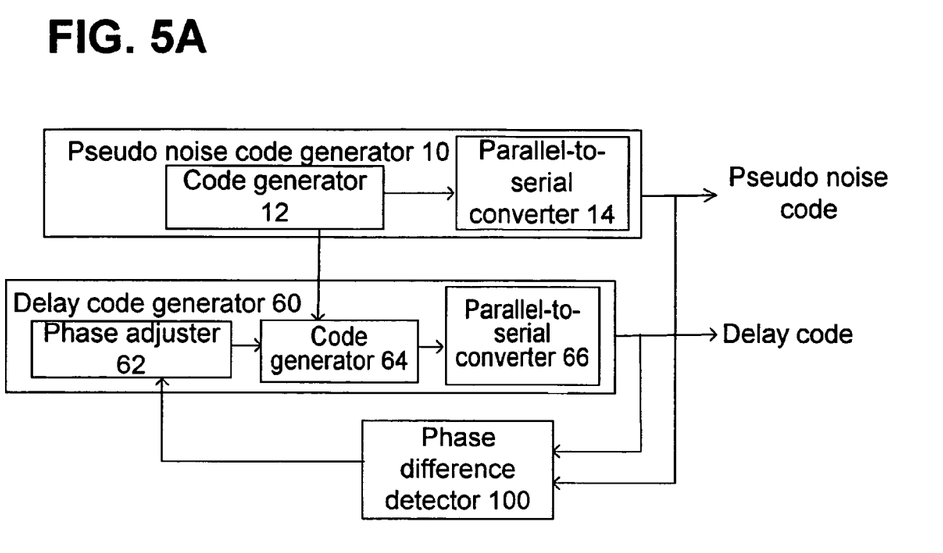
FIG. 5A shows a diagram illustrating an exemplary configuration for synchronization adjustment between a pseudo noise code generator 10 and a delay code generator 60.
Figure 5B:
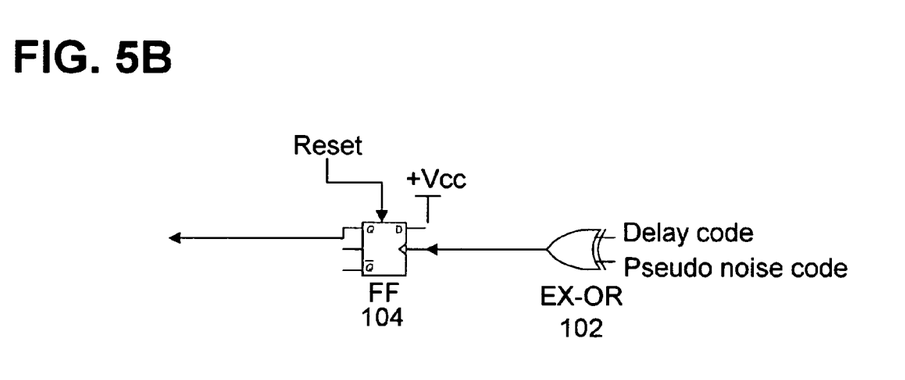
FIG. 5B shows a diagram illustrating an exemplary circuit configuration of a phase difference detector 100.

FIGS. 5A, 5B show diagrams illustrating an exemplary configuration for synchronization adjustment between pseudo noise code generator 10 and delay code generator 60. In FIG. 5A, pseudo noise code generator 10 includes a code generator 12 for generating a pseudo noise code (PN code) as parallel data, and a parallel-to-serial converter 14 for converting the PN code of parallel data into a serial data, and thereby the PN code of serial data is output. Delay code generator 60 includes a phase adjuster 62, a code generator 64 for generating a delay code of parallel data according to the delay amount indication from phase adjuster 62, and a parallel-to-serial converter 66 for converting the delay code of parallel data to a serial data, and thereby the delay code of serial data is output. The PN code is forwarded to the transmitting radio-frequency modulator 20, and a portion thereof branches to input into a phase difference detector 100. Also, the delay code is forwarded to correlation calculator 70, and a portion thereof is made branch and is input into phase difference detector 100.

Parallel-to-serial converters 14, 66 are so-called SerDes (Serializer-Deserializer) devices, each converting a low-speed parallel data into a high-speed (for example, no less than 1 Gbps) serial data. SerDes has a phased lock loop (PLL) circuit incorporated therein. Since phases are deviated between SerDes for a few bits because of the phase lock control at the time of turning on the power, phase synchronization is necessary when starting up.

FIG. 5B shows an exemplary circuit configuration of phase difference detector 100. As shown in this FIG. 5B, phase difference detector 100 includes an exclusive-OR circuit 102, and a latch circuit 104 to which the output of the exclusive-OR circuit 102 is input. Accordingly, the circuit configuration and the operation of phase difference detector 100 are identical to those of correlation calculator 70. Namely, when the phase of the PN code deviates from the phase of the delay code, an H-level signal is output from latch circuit 104, while when the phases of both codes are matched, an L-level signal is output from latch circuit 104. The output of latch circuit 104 is input to phase adjuster 62. Phase adjuster 62 produces a delay amount of the delay code for a predetermined unit (for example, 0.5 bit) when the output of latch circuit 104 is the H level, and varies the delay amount by predetermined unit by unit until the output of latch circuit 104 becomes the L level. When the output of latch circuit 104 becomes the L level, the phases of both codes become matched, and thus the synchronization adjustment between the both codes is completed. In addition, after the measurement is started, a delay amount change instruction from error detector 80 is input to phase adjuster 62.

Figure 6:
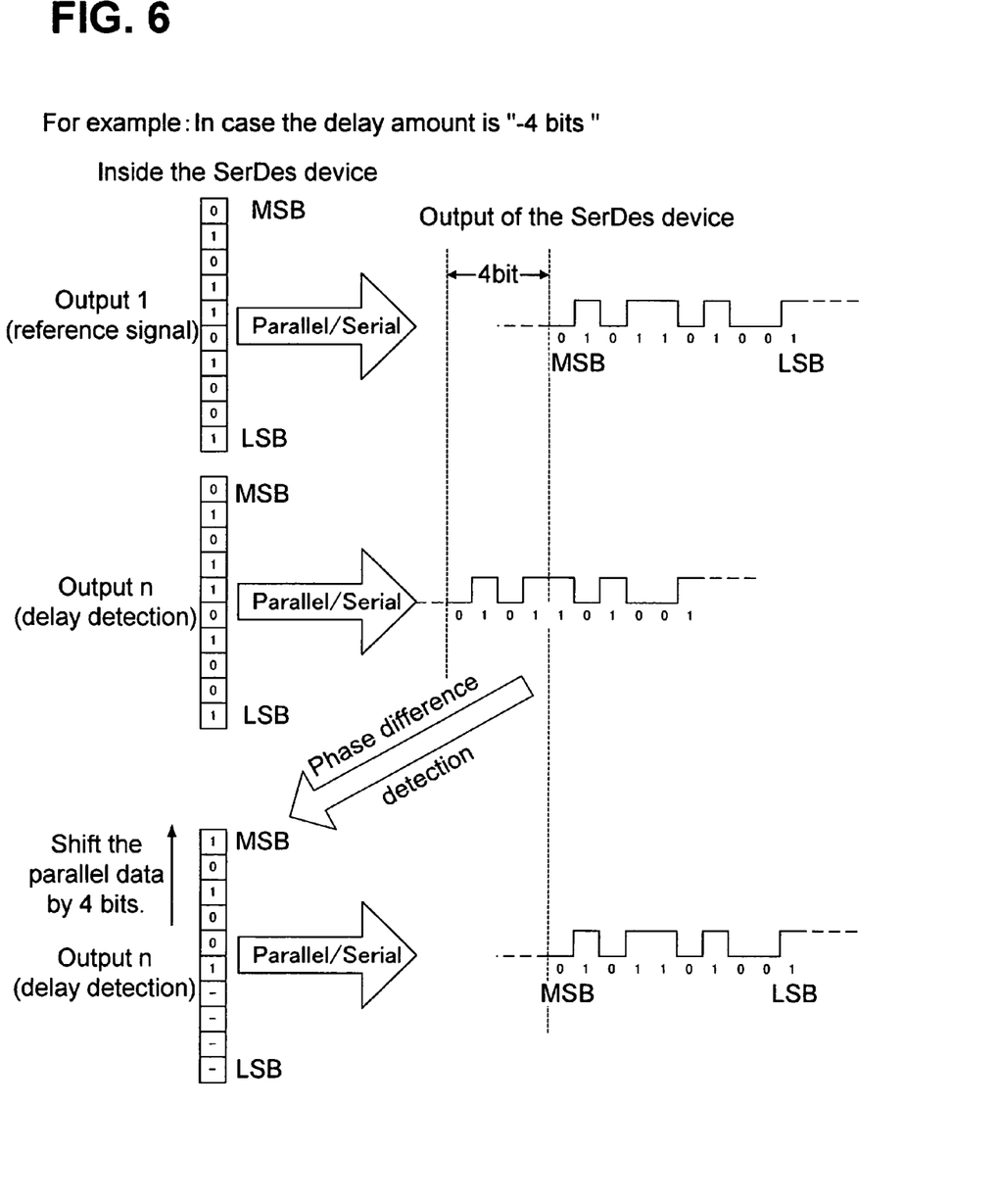
FIG. 6 shows a diagram illustrating synchronization adjustment operation of a delay code generator 60.

FIG. 6 shows a diagram illustrating synchronization adjustment operation of delay code generator 60. As shown in this FIG. 6, the pseudo noise code and the delay code of parallel data are converted into serial data. When a phase difference exists between the pseudo noise code and the delay code, the phase difference is detected through the operation of phase difference detector 100. Phase adjuster 62 successively delays the delay code phase by predetermined unit by unit (for example, 1 bit), based on the phase difference detected by phase difference detector 100. Thereafter, as shown in the figure, assuming an original phase difference is +4 bits, when the delay code of parallel data has been shifted for 4 bits, phase difference detector 100 no more detects phase difference, and the synchronization adjustment is completed.

The unit of delay amount adjustment in phase adjuster 62 is set to one bit unit or less (for example, 0.5 bit or 0.2 bit). Preferably, there are provided a phase adjustment section adjusting on a basis of one unit, and another phase adjustment section adjusting on a basis of less than one unit.

Figure 7:
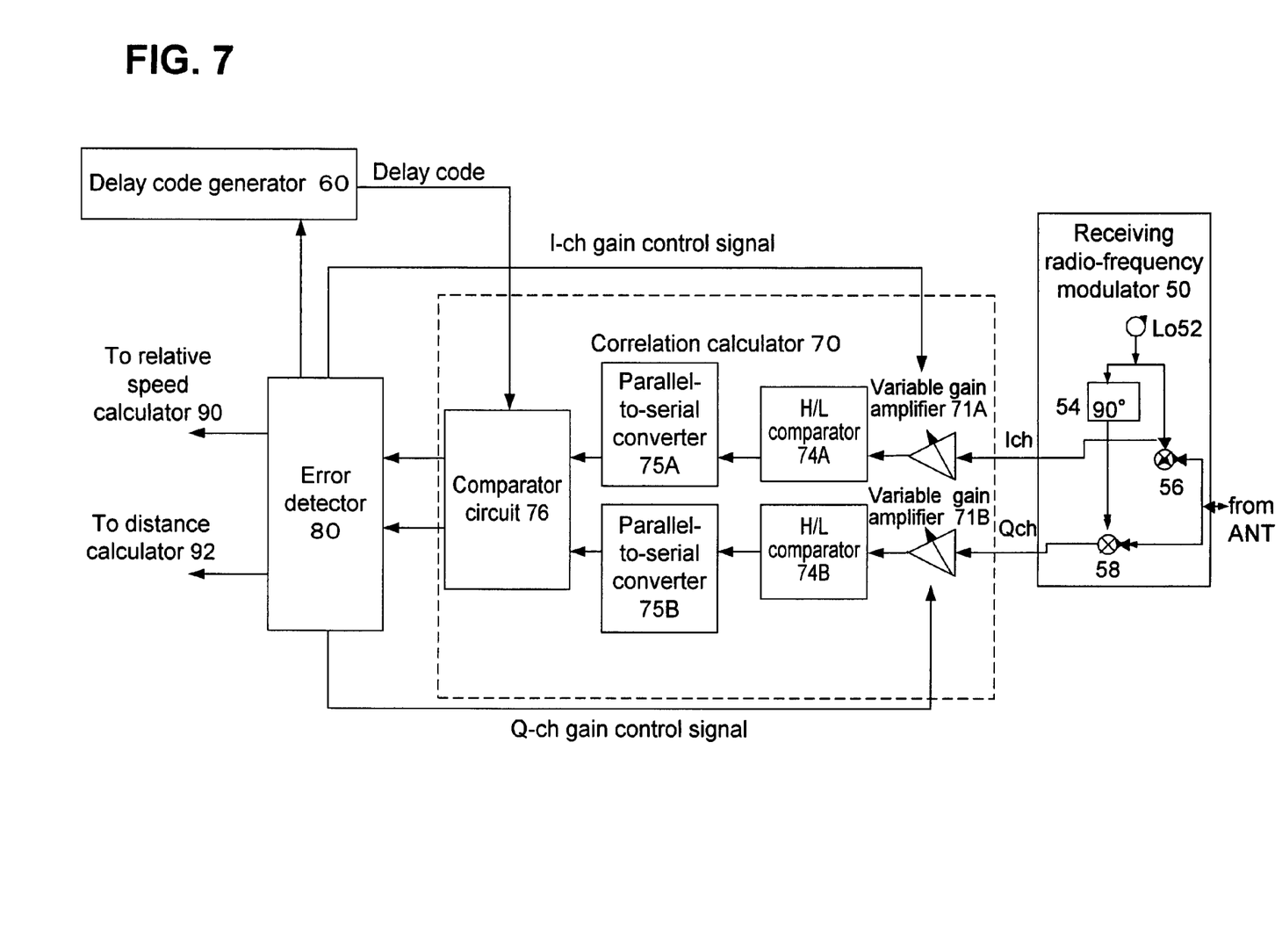
FIG. 7 shows a diagram illustrating a second exemplary circuit configuration of correlation calculator 70.

FIG. 7 shows a diagram illustrating a second exemplary circuit configuration of correlation calculator 70. In FIG. 7, the demodulated signal (I-component and Q-component) of serial data is restored to parallel data, and correlation calculation is performed using those parallel data. The I-component and the Q-component amplified by variable gain amplifiers 71A, 71B are input to logic circuits for converting the components into binary data of the H/L levels, and H/L comparators 74A, 74B.

Variable gain amplifiers 71A, 71B amplify the reception signal level (I-component and Q-component) so that the levels fall within a tolerable input range of H/L comparators 74A, 74B. At this time, similarly to the first exemplary circuit configuration shown in FIG. 2, the gains of variable gain amplifiers 71A, 71B are determined based on the delay amount in case error detector 80 has judged the correlation is existent. With this, the gain is not changed for a temporarily varied reception signal level caused by, for example, the reception signal from an object which may not be the target with high possibility. Thus, since the gain is not decreased even if the level is abruptly increased from the reception signal received so far from the target, the input levels to H/L comparators 75A, 75B exceed the tolerable input level. Also, since the gain is not increased even if the level is abruptly decreased from the reception signal state from the target, the input levels fall below the tolerable input level. Accordingly, H/L comparators 74A, 74B do not operate against these reception signals. Accordingly, the correlation calculation is not performed against such an object which is no the target. Thus, it becomes possible to maintain continuous measurement for the target.

Parallel-to-serial converters 75A, 75B are constituted of so-called SerDes (Serializer-Deserializer) devices, each converting a low-speed parallel data into a high-speed (for example, 1 Gbps or more) serial data. In these parallel-to-serial converters 75A, 75B, the serial data signal output from H/L comparators 74A, 74B are converted into parallel data. A comparator circuit 76 compares the I-component data and the Q-component data for one period, which are converted into parallel data, with the parallel data of the delay code for one period, on a bit-by-bit basis. Comparator circuit 76 is constituted of, for example, a subtractor circuit in which subtraction is performed bit by bit. When the comparison results in a match for the entire bits, comparator circuit 76 outputs a match signal (for example, an L-level signal) to error detector 80, while when the digital values are different in even one bit, comparator circuit 76 outputs a mismatch signal (for example, an H-level signal). The processing operation of error detector 80 is substantially identical to that illustrated in FIG. 4. In place of the outputs from FF 73A, 73B in step S12 of FIG. 4 in regard to the first exemplary circuit configuration shown in FIG. 2, the outputs from comparator circuit 76 are stored. The distance to the target and the relative speed are obtained based on the delay amount determined in error detector 80.

Further, in the second circuit configuration, the delay code is supplied from delay code generator 60 to comparator circuit 76 in the form of parallel data. Accordingly, in the second circuit configuration, the delay code of parallel data is input to comparator circuit 76 before being converted into a serial data in parallel-to-serial converter 66 shown in FIG. 5A.

Figure 8:
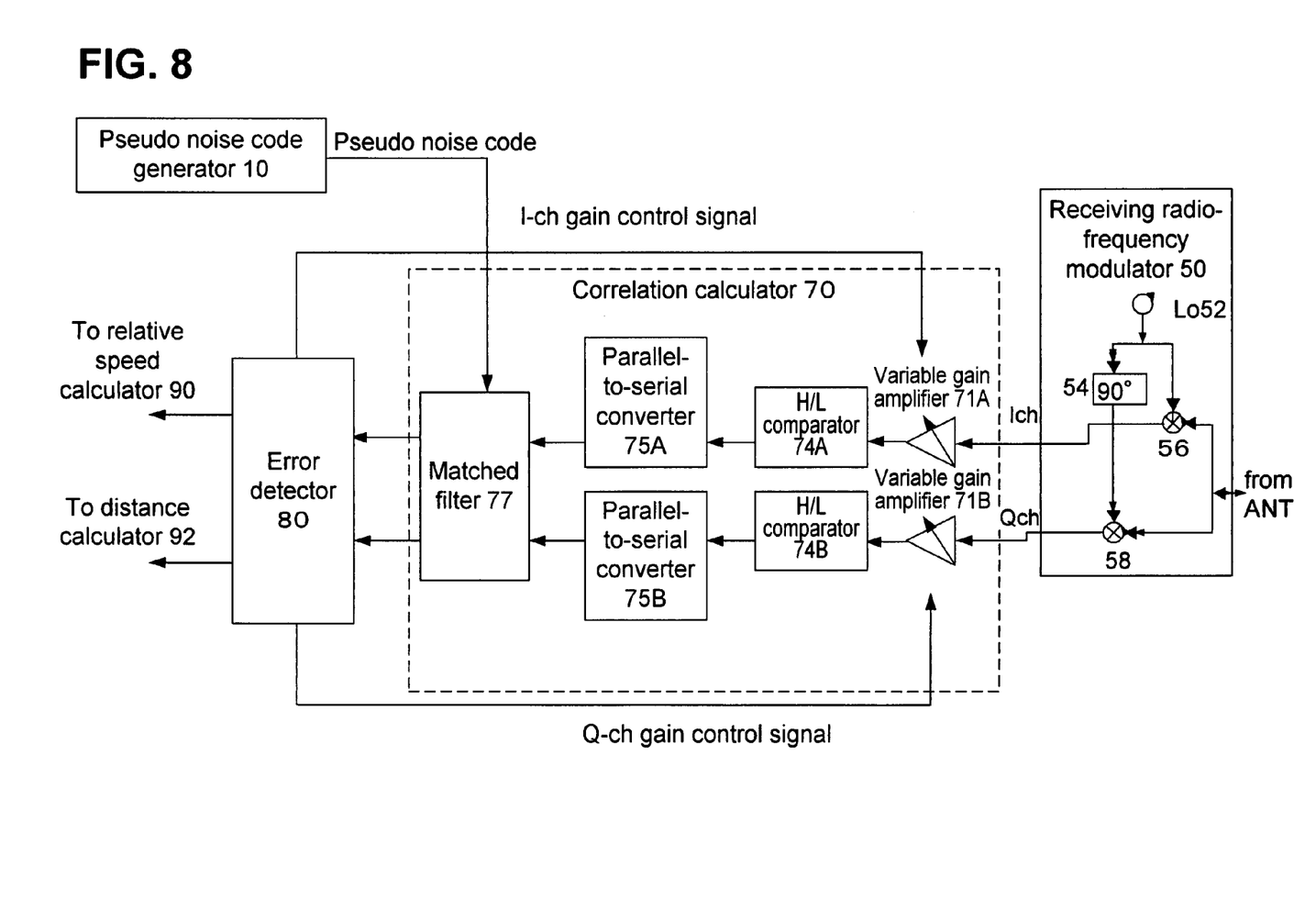
FIG. 8 shows a diagram illustrating a third exemplary circuit configuration of correlation calculator 70.

FIG. 8 shows a diagram illustrating a third exemplary circuit configuration of correlation calculator 70. In the above-mentioned second circuit configuration, the sliding correlation scheme is applied, in which the correlation is detected by successively varying the delay amount of the delay code. In contrast, in the third circuit configuration, the delay amount is directly obtained by performing correlation detection in one time period of the PN code, using a matched filter 77. Matched filter 77 is constituted of, for example, a surface acoustic wave (SAW) filter. In a similar way to the second circuit configuration, the demodulated signal (I-component and Q-component) of serial data is amplified in variable gain amplifiers 71A, 71B, binary-converted in H/L comparators 74A, 74B, and thereafter converted into parallel data in serial-to-parallel converters 75A, 75B.

Instead of the delay code, the PN code fed from pseudo noise code generator 10 is input to matched filter 77 in the form of parallel data. The delay amount between the demodulated signal and the PN code is detected directly. Matched filter 77 supplies to error detector 80 an output signal corresponding to the delay amount.

Figure 9:
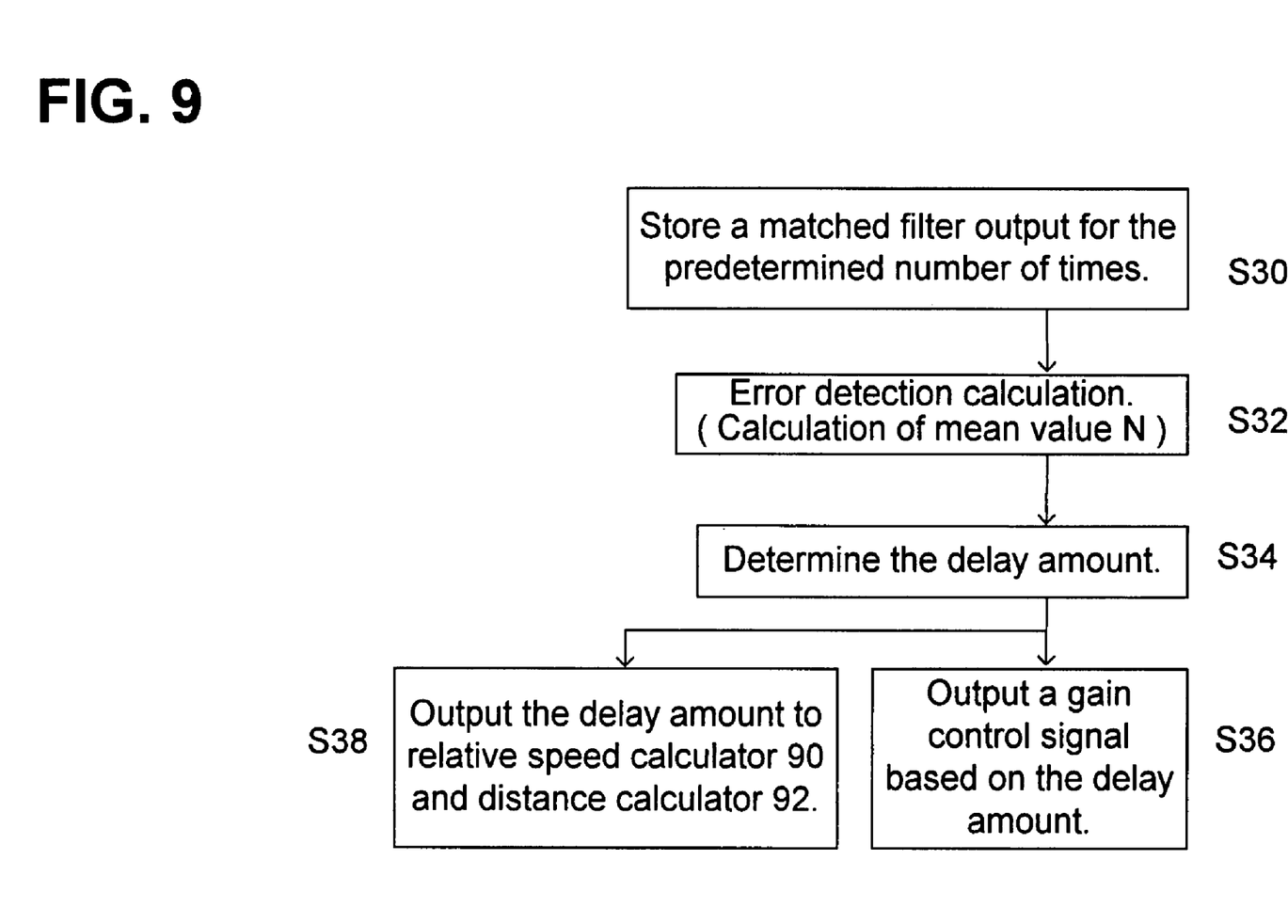
FIG. 9 shows a diagram illustrating processing operation of error detector 80 in the third circuit configuration.

FIG. 9 shows a diagram illustrating processing operation of error detector 80 in the third circuit configuration. In FIG. 9, first, error detector 80 stores as many as a predetermined number of output values corresponding to the delay amounts fed from matched filter 77 (S30). Error detector 80 then calculates the aforementioned mean value N corresponding to each delay amount on a basis of the variation unit of the delay amount (S32), and compares the maximum mean value $N_{max}$ with a predetermined threshold. If the mean value $N_{max}$ exceeds the threshold, the delay amount causing the mean value $N_{max}$ is determined as delay amount corresponding to the distance or the relative speed to the target (S34). If no mean values exceed the threshold, the process returns to S30, and correlation detection is resumed.

Thereafter, in a similar way to the processing shown in FIG. 4, error detector 80 adjusts the gains of variable gain amplifiers 71A, 71B based on the determined delay amount (S36). The determined delay amount is then supplied to relative speed calculator 90 and distance calculator 92 (S38)

Also, in the above embodiments of the second circuit configuration and the third circuit configuration, correlation calculator 70 and error detector 80 for correlation detection processing can be configured of a simple digital processing circuit without using an analog-to-digital converter. Thus, it becomes easy to incorporate the circuit into an LSI, and reduction of power consumption, miniaturization and cost reduction can be attained. Further, by amplifying the demodulated signal level based on the phase difference (delay amount) at the time correlation is judged existent, incorrect detection of an object other than the target can be eliminated, and accurate tracking of the target can be achieved.

In the aforementioned embodiments of the present invention, the pseudo noise code is not limited to the M-sequence PN code, and instead, another code may be applicable, for example, non-M-sequence Gold code. The Gold code is a code sequence obtained by adding two M series having the same period.

Further, in the above embodiments, the target is exemplified by a preceding vehicle. However, not limited to the above, the target may be a succeeding vehicle.

According to the radar equipment of the present invention, the reception signal is amplified with feedback based on the delay amount obtained from the correlation detection result. Accordingly, it becomes possible to maintain the reception signal (demodulated signal) level to a proper level depending on the distance to the target, and accurate measurement can be achieved with high precision. Namely, the reception signal is amplified depending on the distance to the target, and the reception signal level is made within a tolerable input level range of a logic circuit for performing correlation calculation. In particular, during tracking the target, even when a reflected signal is received with abrupt level variation caused by noise or a reflected signal from an object other than the target, incorrect detection of the target can be avoided by disabling the correlation calculation.

Further, the radar equipment in accordance with the present invention can be configured of a simple digital processing circuit, and the circuit can suitably be incorporated into an LSI. Also, reduction of consumption power, miniaturization and cost reduction can be attained.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. Radar equipment comprising:
   a pseudo noise code generator generating a first pseudo noise code;

a delay code generator generating delay codes by delaying the first pseudo noise code by predetermined time unit by time unit;

a transmitter transmitting a radio signal modulated by the first pseudo noise code generator;

a receiver receiving a reflected signal of a radio signal being reflected on a target, and outputting a second pseudo noise code by demodulating the reflected signal;

an amplifier amplifying the second pseudo noise code;

a detector detecting the delay amount between the first pseudo noise code and the second pseudo noise code, based on correlation calculation between the delay code and the second pseudo noise code output from the amplifier, and controlling the amplifier gain based on the delay amount; and a calculation section calculating at least one of the distance and the relative speed to the target, based on the delay amount.

2. The radar equipment according to claim 1, wherein the detector comprises a logic circuit to which the delay code and the second pseudo noise code output from the amplifier are input, and the amplifier gain is controlled so that the level of the second pseudo noise code falls within a tolerable input level range of the logic circuit.

3. The radar equipment according to claim 2, wherein the logic circuit performs correlation calculation between the second pseudo noise code and each of a plurality of delay codes being delayed by predetermined time unit by time unit over one period of the first pseudo noise code, respectively for a plurality of times, and the detector calculates a mean value of the plurality of times of the correlation calculation results for each delay code obtained in the logic circuit, and detects the delay amount based on the mean value for each delay code.

4. The radar equipment according to claim 1, wherein the detector comprises a logic circuit to which the second pseudo noise code output from the amplifier is input, and controls the amplifier gain so that the level of the second pseudo noise code falls within a tolerable input level range of the logic circuit.

5. The radar equipment according to claim 4, wherein the logic circuit, to which the second pseudo noise code output from the amplifier is input, performs binary conversion of the second pseudo noise code, and the detector comprises a converter converting the output from the logic circuit into a parallel data, and a calculation section performing the correlation calculation between the second pseudo noise code and each of a plurality of delay codes being delayed by predetermined time unit by time unit over one period of the first pseudo noise code in the form of parallel data, respectively for a plurality of times, and the detector calculates a mean value of the plurality of times of the correlation calculation results for each delay code obtained in the calculation section, and detects the delay amount based on the mean value for each delay code.

6. The radar equipment according to claim 1, further comprising:

an adjuster detecting existence of phase difference between the first pseudo noise code and the delay code, and when the phase difference is existent, adjusting the phase of either the first pseudo noise code or the delay code, so that the first pseudo noise code and the delay code are synchronized.

7. The radar equipment according to claim 6, wherein, when initiating the pseudo noise code generator and the delay code generator, the adjuster adjusts the phase of either the first pseudo noise code or the delay code.

8. Radar equipment comprising:

a pseudo noise code generator generating a first pseudo noise code;

a transmitter transmitting a radio signal modulated by the first pseudo noise code generator;

a receiver receiving a reflected signal of a radio signal being reflected on a target, and outputting a second pseudo noise code by demodulating the reflected signal;

an amplifier amplifying the second pseudo noise code;

a detector detecting the delay amount between the first pseudo noise code and the second pseudo noise code, based on correlation calculation between the delay code and the second pseudo noise code output from the amplifier, and controlling the amplifier gain based on the delay amount; and a calculation section calculating at least one of the distance and the relative speed to the target, based on the delay amount.

9. The radar equipment according to claim 8, wherein the correlation detector comprises a logic circuit to which the second pseudo noise code output from the amplifier is input, and the amplifier gain is controlled so that the level of the second pseudo noise code falls within a tolerable input level range of the logic circuit.

10. The radar equipment according to claim 9, wherein the logic circuit, to which the second pseudo noise code output from the amplifier is input, performs binary conversion of the second pseudo noise code, and the detector comprises a converter converting the output from the logic circuit into a parallel data, and a matched filter performing the correlation calculation between the first pseudo noise code and the second pseudo noise code in the form of parallel data for a plurality of times, and the detector calculates a mean value of the plurality of times of the correlation calculation results for each delay code obtained in the matched filter, and detects the delay amount based on the mean value for each delay code.

* * * * *